United States Patent
Zhang et al.

(10) Patent No.: US 11,071,148 B2
(45) Date of Patent: Jul. 20, 2021

(54) SYSTEM INFORMATION TRANSMISSON METHOD, BASE STATION AND TERMINAL

(71) Applicant: GUANGDONG OPPO MOBILE TELECOMMUNICATIONS CORP., LTD., Guangdong (CN)

(72) Inventors: Zhi Zhang, Dongguan (CN); Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 17 days.

(21) Appl. No.: 16/575,937

(22) Filed: Sep. 19, 2019

(65) Prior Publication Data

US 2020/0015281 A1    Jan. 9, 2020

Related U.S. Application Data

(63) Continuation of application No. PCT/CN2017/077381, filed on Mar. 20, 2017.

(51) Int. Cl.
*H04W 74/08* (2009.01)
*H04W 72/04* (2009.01)

(52) U.S. Cl.
CPC ... *H04W 74/0833* (2013.01); *H04W 72/0446* (2013.01)

(58) Field of Classification Search
CPC .................................................. H04W 74/0833
(Continued)

(56) References Cited

U.S. PATENT DOCUMENTS

| 2010/0113053 A1 | 5/2010 | Bienas et al. |
| 2012/0329442 A1* | 12/2012 | Luft ................. H04W 74/0833 455/418 |
| 2017/0273108 A1* | 9/2017 | Damnjanovic ..... H04W 74/085 |

FOREIGN PATENT DOCUMENTS

| CN | 102111846 A | 6/2011 |
| CN | 102892192 A | 1/2013 |

(Continued)

OTHER PUBLICATIONS

Intel Corporation: "Msg3 vs. Msg1 for on-demand SI request", 3GPP Draft; R2-1701737, 3rd Generation Partnership Project (3GPP), vol. RAN WG2, No. Athens, Greece; Feb. 13, 2017-Feb. 17, 2017 Feb. 12, 2017 (Feb. 12, 2017), XP051212310.

(Continued)

*Primary Examiner* — Nghi H Ly

(57) ABSTRACT

Embodiments of the present disclosure disclose a system information transmission method, a base station and a terminal. The method includes: a base station configuring physical random access channel (PRACH) parameters according to an access purpose of a terminal, and transmitting to the terminal, the access purpose comprising to request system information or to request initial access, the PRACH parameters comprising a number of a PRACH occasion and a time interval for the terminal to retransmit a random access request, each of the PRACH occasion corresponding to a different PRACH resource; receiving a random access request transmitted by the terminal according to the PRACH parameters selected according to the access purpose; if the access purpose of the terminal is to request the system information, transmitting system information to the terminal. The embodiments of the present disclosure facilitate system efficiency optimization.

15 Claims, 5 Drawing Sheets

(58) Field of Classification Search
USPC .................................. 370/336, 328, 329, 338
See application file for complete search history.

(56) References Cited

FOREIGN PATENT DOCUMENTS

| CN | 105009479 A | 10/2015 |
|---|---|---|
| CN | 105009497 A | 10/2015 |
| CN | 105122700 A | 12/2015 |
| WO | 2014/110804 A1 | 7/2014 |
| WO | 2016198909 A1 | 12/2016 |

OTHER PUBLICATIONS

Interdigital Communication: "Acquisition of Other-SI", 3GPP Draft; R2-1700230(NR SI AI3224 Acquisition of Other-SI), 3rd Generation Partnership Project (3GPP), vol. RAN WG2, No. Spokane, Wa; Jan. 17, 2017-Jan. 19, 2017 Jan. 17, 2017(Jan. 17, 2017), XP051210812.

The European Search Report of corresponding European application No. 17902412.0, dated Feb. 4, 2020.
The First Office Action of corresponding Chinese application No. 201780088683.2, dated May 7, 2020.
The first Office Action of corresponding European application No. 17902412.0, dated Sep. 29, 2020.
The first Office Action of corresponding Indian application No. 201917038904, dated Jan. 12, 2021.
Fujitsu, Considerations about on-demand SI acquiring procedure, 3GPP TSG RAN WG2 #97 R2-1701397, Feb. 3, 2017.
Guangdong Oppo Mobile Telecom, Discussion on the request for the on demand SI, 3GPP TSG RAN WG1 #88 R1-1701940, Feb. 6, 2017.
The first Office Action of corresponding Japanese application No. 2019-552079, dated Feb. 16, 2021.
The first Office Action of corresponding Korean application No. 10-2019-7028548, dated Apr. 29, 2021.

\* cited by examiner

SYSTEM INFORMATION TRANSMISSION METHOD, BASE STATION AND TERMINAL

CROSS-REFERENCE TO RELATED APPLICATIONS

This application is a continuation of International Application No. PCT/CN2017/077381, filed on Mar. 20, 2017, the content of which is incorporated herein by reference in its entirety.

TECHNICAL FIELD

The present disclosure relates to the field of communications technologies, and in particular, to a system information transmission method, a base station, and a terminal.

BACKGROUND

In a Long Term Evolution (LTE) system, system information (SI) is periodically transmitted, and system information can be received regardless of whether a terminal is in a connected state or an idle state. The scheduling period of all system information can be indicated by the System Information Block (SIB) 1. Since this periodic transmission mode may cause redundant transmission of system information, for example, when the system information SIBx (x may be 1, 2, . . . ) is transmitted, the terminal in the existing system has acquired the system information or does not need the system information, then transmission of the SIBx will result in waste of resources.

Therefore, in the design of a new wireless communication system such as the 5th Generation (5G) New Radio (NR) system, the system information can be divided into necessary system information and non-essential system information. For necessary system information, for example, the system information including information such as access, the base station may transmit in a conventional broadcast manner; for the non-essential system information, the base station may transmit when requested by the terminal. However, which manner of transmission is better is still a problem to be solved.

SUMMARY

Embodiments of the present disclosure provide a system information transmission method, a base station and a terminal, which can transmit the system information according to terminal requirements, thereby facilitating system efficiency optimization.

A first aspect of the embodiments of the present disclosure provides a system information transmission method, including:

receiving a random access request that is transmitted by the terminal according to physical random access channel (PRACH) parameters selected according to an access purpose, wherein the access purpose comprises to request system information or to request initial access, the PRACH parameters comprise a number of a PRACH occasion and a time interval for the terminal to retransmit the random access request, and each of the PRACH occasion corresponds to a different PRACH resource; and transmitting the system information to the terminal if the access purpose of the terminal is to request the system information.

In a possible implementation, if the access purpose of the terminal is to request the system information, the number of the PRACH occasion is at least one, and the time interval for the terminal to retransmit the random access request is larger than a period of system information broadcasting by the base station.

In a possible implementation, if the access purpose of the terminal is to request the initial access, the base station transmits uplink scheduling information to the terminal, the number of the PRACH occasion is one, and the time interval for the terminal to retransmit the random access request is smaller than the time interval for the terminal to retransmit the random access request when requesting the system information.

In a possible implementation, the PRACH parameters are configured by the base station according to the access purpose of the terminal and transmitted to the terminal; or the PRACH parameters are preconfigured by a system and stored in the base station and the terminal.

In a possible implementation, the number of the PRACH occasion and the time interval for the terminal to retransmit the random access request are obtained by configuring a value of a same variable, and the value of the variable is positively correlated with a period of broadcasting that corresponds to the system information requested by the terminal.

A second aspect of the embodiments of the present disclosure provides a system information transmission method, including:

selecting, by a terminal, physical random access channel (PRACH) parameters according to an access purpose, where the access purpose includes to request system information or to request initial access, the PRACH parameters include a number of a PRACH occasion and a time interval for the terminal to retransmit a random access request, and each of the PRACH occasion corresponds to a different PRACH resource;

transmitting the random access request to a base station using the selected PRACH parameters; and receiving the system information transmitted by the base station if the access purpose of the terminal is to request the system information.

In a possible implementation, if the access purpose of the terminal is to request the system information, the number of the PRACH occasion is at least one, and the time interval for the terminal to retransmit the random access request is larger than a period of system information broadcasting by the base station.

In a possible implementation, if the access purpose of the terminal is to request the initial access, the base station transmits uplink scheduling information to the terminal, the number of the PRACH occasion is one, and the time interval for the terminal to retransmit the random access request is smaller than the time interval for the terminal to retransmit the random access request when requesting the system information.

In a possible implementation, the PRACH parameters are configured by the base station and transmitted to the terminal, or the PRACH parameters are preconfigured by a system and stored in the base station and the terminal.

In a possible implementation, the number of the PRACH occasion and the time interval for the terminal to retransmit the random access request are obtained by configuring a value of a same variable, and the value of the variable is positively correlated with a period of broadcasting that corresponds to the system information requested by the terminal.

A third aspect of the embodiments of the present disclosure provides a base station, including:

a receiving unit, configured to receive a random access request transmitted by the terminal according to physical random access channel (PRACH) parameters selected according to an access purpose, wherein the access purpose comprises to request system information or to request initial access, the PRACH parameters comprise a number of a PRACH occasion and a time interval for the terminal to retransmit the random access request, and each of the PRACH occasion corresponds to a different PRACH resource; and a transmitting unit, configured to transmit the system information to the terminal if the access purpose of the terminal is to request the system information.

In a possible implementation, if the access purpose of the terminal is to request the system information, the number of the PRACH occasion is at least one, and the time interval for the terminal to retransmit the random access request is larger than a period of system information broadcasting by the base station.

In a possible implementation, if the access purpose of the terminal is to request the initial access, the transmitting unit is further configured to transmit uplink scheduling information to the terminal, where the number of the PRACH occasion is one, and the time interval for the terminal to retransmit the random access request is smaller than the time interval for the terminal to retransmit the random access request when requesting system information.

In a possible implementation, the PRACH parameters are configured by the base station according to the access purpose of the terminal and transmitted to the terminal; or the PRACH parameters are preconfigured by a system and stored in the base station and the terminal.

In a possible implementation, the number of the PRACH occasion and the time interval for the terminal to retransmit the random access request are obtained by configuring a value of a same variable, and the value of the variable is positively correlated with a period of broadcasting that corresponds to the system information requested by the terminal.

A fourth aspect of the embodiments of the present disclosure provides a base station, including:

a processor, a memory, a transceiver and a bus, the processor, the memory and the transceiver being connected by the bus, where the transceiver is configured to receive and transmit signals and communicate with a terminal, the memory is configured to store a set of program codes, and the processor is configured to invoke the program codes stored in the memory to perform following operations:

receiving, through the transceiver, a random access request transmitted by the terminal according to physical random access channel (PRACH) parameters selected according to an access purpose, wherein the access purpose comprises to request system information or to request initial access, the PRACH parameters comprise a number of a PRACH occasion and a time interval for the terminal to retransmit the random access request, and each of the PRACH occasion corresponds to a different PRACH resource; and transmitting, through the transceiver, the system information to the terminal if the access purpose of the terminal is to request the system information.

In a possible implementation, if the access purpose of the terminal is to request the system information, the number of the PRACH occasion is at least one, and the time interval for the terminal to retransmit the random access request is larger than a period of system information broadcasting by the base station.

In a possible implementation, if the access purpose of the terminal is to request the initial access, the processor is further configured to transmit uplink scheduling information to the terminal through the transceiver, the number of the PRACH occasion is one, and the time interval for the terminal to retransmit the random access request is smaller than the time interval for the terminal to retransmit the random access request when requesting the system information.

In a possible implementation, the PRACH parameters are configured by the base station according to the access purpose of the terminal and transmitted to the terminal; or the PRACH parameters are preconfigured by a system and stored in the base station and the terminal.

In a possible implementation, the number of the PRACH occasion and the time interval for the terminal to retransmit the random access request are obtained by configuring a value of a same variable, and the value of the variable is positively correlated with a period of broadcasting that corresponds to the system information requested by the terminal.

A fifth aspect of the embodiments of the present disclosure provides a terminal, including:

a processing unit, configured to select physical random access channel (PRACH) parameters according to an access purpose, where the access purpose includes to request system information or to request initial access, the PRACH parameters include a number of a PRACH occasion and a time interval for the terminal to retransmit a random access request, and each of the PRACH occasion corresponds to a different PRACH resource;

a transmitting unit, configured to transmit a random access request to a base station by using the selected PRACH parameters; and a receiving unit, configured to receive the system information transmitted by the base station if the access purpose of the terminal is to request the system information.

In a possible implementation, if the access purpose of the terminal is to request the system information, the number of the PRACH occasion is at least one, and the time interval for the terminal to retransmit the random access request is larger than a period of system information broadcasting by the base station.

In a possible implementation, if the access purpose of the terminal is to request the initial access, the receiving unit is further configured to receive uplink scheduling information transmitted by the base station, the number of the PRACH occasion is one, and the time interval for the terminal to retransmit the random access request is smaller than the time interval for the terminal to retransmit the random access request when requesting the system information.

In a possible implementation, the PRACH parameters are configured by the base station and transmitted to the terminal, or the PRACH parameters are preconfigured by the system and stored in the base station and the terminal.

In a possible implementation, the number of the PRACH occasion and the time interval for the terminal to retransmit the random access request are obtained by configuring a value of a same variable, and the value of the variable is positively correlated with a period of broadcasting that corresponds to the system information requested by the terminal.

A sixth aspect of the embodiments of the present disclosure provides a terminal, including:

a processor, a memory, a transceiver and a bus, the processor, the memory and the transceiver being connected by a bus, where the transceiver is configured to receive and transmit signals and communicate with a base station, the memory is configured to store a set of program codes, the processor is configured to invoke the program codes stored in the memory to perform the following operations:

selecting physical random access channel (PRACH) parameters according to an access purpose, where the access purpose includes to request system information or to request initial access, the PRACH parameters include a number of a PRACH occasion and a time interval for the terminal to retransmit a random access request, and each of the PRACH occasion corresponds to a different PRACH resource;

transmitting, through the transceiver, a random access request to the base station by using the selected PRACH parameters; and receiving, through the transceiver, the system information transmitted by the base station if the access purpose of the terminal is to request the system information.

In a possible implementation, if the access purpose of the terminal is to request the system information, the number of the PRACH occasion is at least one, and the time interval for the terminal to retransmit the random access request is larger than a period of system information broadcasting by the base station.

In a possible implementation, if the access purpose of the terminal is to request the initial access, the processor is further configured to receive, through the transceiver, uplink scheduling information transmitted by the base station, the number of the PRACH occasion is one, and the time interval for the terminal to retransmit the random access request is smaller than the time interval for the terminal to retransmit the random access request when requesting the system information.

In a possible implementation, the PRACH parameters are configured by the base station and transmitted to the terminal, or the PRACH parameters are preconfigured by a system and stored in the base station and the terminal.

In a possible implementation, the number of the PRACH occasion and the time interval for the terminal to retransmit the random access request are obtained by configuring a value of a same variable, and the value of the variable is positively correlated with a period of broadcasting that corresponds to the system information requested by the terminal.

A seventh aspect of the embodiments of the present disclosure provides a computer storage medium, the computer storage medium including a set of program codes for performing the method as described in any one of the implementations of the first aspect of the embodiments of the present disclosure.

An eighth aspect of the embodiments of the present disclosure provides a computer storage medium, the computer storage medium including a set of program codes for performing the method as described in any one of the implementations of the second aspect of the embodiments of the present disclosure.

The implementation of the embodiments of the present disclosure has the following beneficial effects:

the base station can configure PRACH parameters for a terminal according to an access purpose of the terminal, the terminal can select appropriate PRACH parameters according to its own access purpose to transmit a random access request to the base station; when the access purpose of the terminal is to request system information, the system information can be transmitted to the terminal, thereby realizing the transmission of the system information. The PRACH parameters include the number of the PRACH occasion and the time interval for the terminal to retransmit the random access request, and can be flexibly configured according to the requirements of the terminal, which can not only fully meet the requirements of the terminal, but also meet the compatibility of the communication system, and facilitate system efficiency improvement.

BRIEF DESCRIPTION OF THE DRAWINGS

In order to more clearly illustrate the embodiments of the present disclosure or the technical solutions in the prior art, the drawings to be used in the embodiments will be briefly described below. Obviously, the drawings in the following description are only some embodiments of the present disclosure, and those skilled in the art can obtain other drawings according to these drawings without any creative efforts.

DESCRIPTION OF EMBODIMENTS

Figure 1:
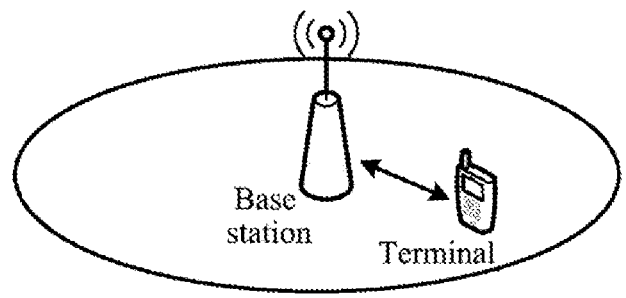
FIG. 1 is a schematic structural diagram of a communication system according to an embodiment of the present disclosure.

Terms "comprising" and "including" and any variations thereof in the specification and claims of the present disclosure and in the drawings mentioned above are intended to cover nonexclusive inclusions. For example, a process, a method, a system, a product, or an apparatus that includes a series of steps or units is not limited to the listed steps or units, but in an embodiment further includes steps or units not listed; or, in an embodiment further includes other steps or units inherent to these processes, methods, products or apparatus.

With the continuous improvement of people's communication demand, communication technology is developing rapidly, which can provide users with wider bandwidth, faster uplink and downlink transmission speed, etc. For example, in a 5G system, a system bandwidth of up to 200 MHz can be provided. However, as the number of users increases continuously, the efficiency of the system becomes more and more important. In order to ensure efficient operation of the communication system, it is expected to reduce some redundant transmission of information for the base station. Therefore, the embodiments of the disclosure provides a system information transmission method, so that the base station can know the access purpose of the terminal after receiving a random access request transmitted by the terminal, so as to flexibly reply according to the access purpose of the terminal, thereby optimizing system efficiency, and the base station or the system can preconfigure physical random access channel (PRACH) parameters used by the terminal to transmit a random access request, for example, transmit a number of a PRACH occasion, and a time interval for random access request retransmission, thereby ensuring that the system information transmission is efficient and normal. For convenience of illustration, the embodiments of the present disclosure are described as a 5G system, those skilled in the art will understand that the implementations in the embodiments of the present disclosure are also applicable to existing communication systems and future higher-level communication systems such as 6G and 7G, which is not limited in the embodiment of the present disclosure.

The system information transmission method and device according to the embodiments of the present disclosure will be described in detail below with reference to the appended drawings.

FIG. 1 is a schematic structural diagram of a communication system according to an embodiment of the present disclosure. It may include a base station and at least one terminal, and the terminal can also be referred to as user equipment (UE).

The base station can be an evolved Node B (eNB), a Node B (NB), a base station controller (BSC), a base transceiver station (BTS), a home base station (for example, Home evolved Node B, or Home Node B (HNB)), a baseband unit (BBU), etc. It can also be referred to by those skilled in the art as a base transceiver, a wireless base station, a wireless transceiver, a transceiver function, a base station sub system (BSS), or some other suitable terminology. It can complete a random access process with a terminal by MSG1-MSG4 and establish radio resource control (RRC) connection with the terminal. At the same time, it can also configure PRACH parameters for the terminal, and transmit corresponding information to the terminal according to an access purpose of the terminal, thereby ensuring to meet the terminal's requirements and optimize system efficiency.

The terminal can include a cellular phone, a smart phone, a session initiation protocol (SIP) phone, a laptop computer, a personal digital assistant (PDA), a satellite radio, a global positioning system, a multimedia device, a video device, a digital audio player (for example, a MP3 player), a camera, a game console, or any other device with similar functions. The terminal can also be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handheld device, a user agent, a mobile client, a client, or some other suitable terminology. It can select appropriate PRACH parameters to transmit a random access request to inform the base station of the terminal's access purpose and obtain the desired information.

The system information transmission method according to the present disclosure will be described in detail below with reference to FIGS. 2 to 5.

Figure 2:
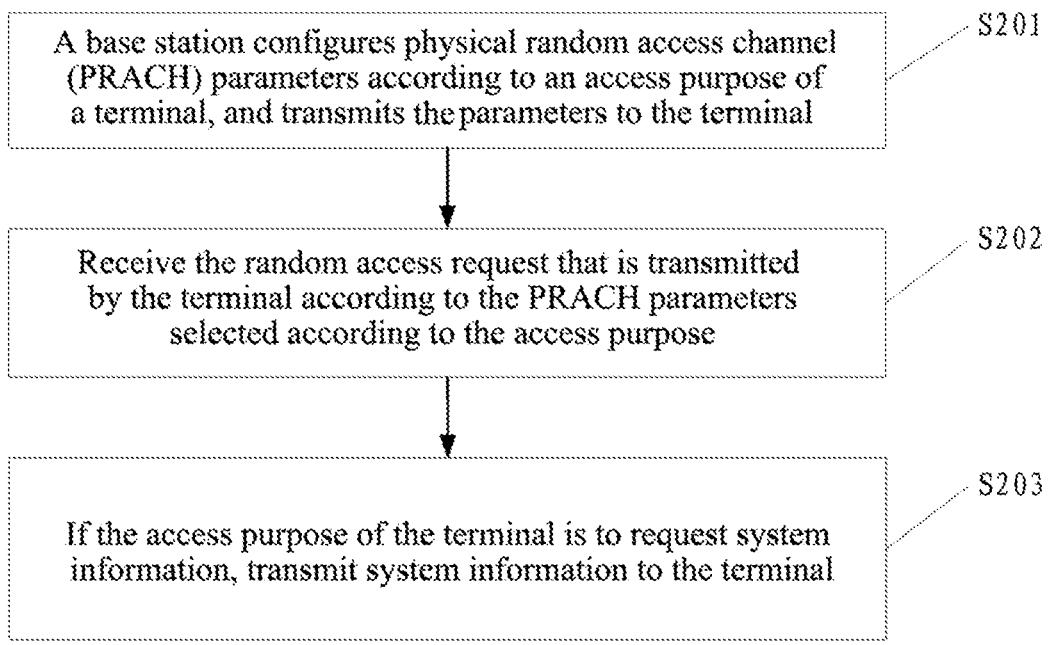
FIG. 2 is a schematic flowchart of a first embodiment of a system information transmission method according to the present disclosure.

FIG. 2 is a schematic flowchart of a first embodiment of a system information transmission method according to the present disclosure; in the present embodiment, the system information transmission method includes following steps:

S201, a base station configures physical random access channel (PRACH) parameters according to an access purpose of a terminal, and transmits the parameters to the terminal.

In an embodiment, the access purpose of the terminal can include, but is not limited to, to request system information or to request initial access.

Or, the access purpose can also be to request both the system information and the initial access.

In order to satisfy different access purposes of the terminal, the base station can configure corresponding PRACH parameters for each of the different access purposes. For example, if there are three access purposes, the base station can configure at least three different PRACH parameters for the terminal.

In an embodiment, the PRACH parameters include a number of a PRACH occasion and a time interval for a terminal to retransmit a random access request; each of the PRACH occasion corresponds to a different PRACH resource.

In an embodiment, the PRACH parameters can be configured by the base station and transmitted to the terminal through a broadcast message, or the PRACH parameters can also be preconfigured by a system and stored in the base station and the terminal as standard parameters. The embodiment of the present disclosure is not limited in any way.

The above configuration of PRACH parameters is based on different access purposes of the terminal. For example, if the purpose of terminal access is for normal initial access, the terminal can select only one PRACH occasion in one random access process, and the time interval of random access request retransmission can be T1 (that is, if the first random access at the current time is unsuccessful, the terminal can initiate another random access after time T1). However, if the purpose of the terminal transmitting the random access request is to request the system to transmit system information (SI), the terminal can select multiple PRACH occasions in one random access process, and the time interval of random access request retransmission can be T2, usually T2>T1.

The reason for the above different configuration is that the system may transmit SI to many terminals, so it may not immediately respond to the SI request of a certain terminal, and the SI is usually transmitted in a certain period. When the purpose of the terminal transmitting the random access request is to request SI, the time interval between transmitting the preceding random access request and transmitting the following random access request should be longer than the period for the system to transmit the SI, otherwise multiple random access requests repeatedly transmitted by the terminal between the two SIs will result in waste of signaling resources. However, if a random access request of the terminal is unsuccessful, the terminal needs to wait for a long time, then the terminal can use multiple PRACH occasions in one random access request, which are used to correspond to multiple receiving beams of the base station, thereby increasing the probability of being detected by the base station in one random access process and improving the success rate of obtaining SI. However, if the purpose of the terminal transmitting the random access is for normal initial access, the terminal may select a different PRACH occasion when retransmitting the random access request after the first random access request is unsuccessful. Different PRACH occasions correspond to different PRACH resources, and the PRACH resources may be different combinations of time domain resources, frequency domain resources, and code domain resources (such as preamble sequences).

The number of the PRACH occasion in the PRACH parameters can be configured as a fixed value for the terminal to select, for example, it can be set to 3, then when selecting this parameter, the terminal can use 3 PRACH occasions when transmitting PRACH once; or it can also be configured as a maximum selectable value or a selectable interval for the terminal to flexibly select according to its own requirements. For example, the maximum selectable value can be configured to be 4, then when the terminal needs to improve the success rate of obtaining system information within a large time interval, the terminal can use 3 or 4 PRACH occasions; when obtaining system information within a small time interval, the terminal can use 2 PRACH occasions. When using an interval for selection, for example, for an interval of [2, 4], 2-4 PRACH occasions can be selected to use.

In an embodiment, the access purpose includes to request system information or to request initial access.

Alternatively, the access purpose can also be to request both the system information and the initial access, and at this time the base station can return the system information and uplink scheduling information to the terminal according to the requirements of the terminal.

The terminal can inform the base station of these different access purposes by selecting PRACH parameters for transmitting random access requests.

After the PRACH parameters are configured by the base station, a preset mapping relationship is formed with the access purpose of the terminal, the preset mapping relationship can be a many-to-one mapping or a one-to-one mapping, and the preset mapping relationship can be informed to the terminal by the base station through a broadcast message. Or, when the PRACH parameters are configured by the system to be used as standard parameters, the preset mapping relationship between the PRACH parameters and the access purpose can be preconfigured by the system and stored in the base station and the terminal to be used as a system standard, which is not limited in the embodiment of the present disclosure.

The terminal can select corresponding PRACH parameters according to different access purposes and transmit random access requests, which can be performed in the form of transmitting MSG1, thereby being beneficial to saving signaling consumption and improving system efficiency.

S202, receive a random access request that is transmitted by the terminal according to the PRACH parameters selected according to the access purpose.

In an embodiment, the terminal initiates a random access request to the base station by transmitting MSG1. Of course, the random access request here is similar to the random access request in the conventional 4G communication system, but there is a difference. The random access request in the present disclosure is initiated after the terminal selects corresponding PRACH parameters according to its own access purpose, which may include conventional random access request information for requesting initial access, and may also include a system information request, or only include the system information request, thereby expanding the functions of MSG1. Of course, the terminal may also adopt other messages to carry the PRACH parameters to inform the base station of the terminal's access purpose, which is not limited in the embodiment of the present disclosure. When using MSG1, it is compatible with the conventional 4G communication system and can save signaling resources.

S203, if the access purpose of the terminal is to request system information, transmit the system information to the terminal.

That is, when the access purpose of the terminal is to request the system information, the base station can transmit the system information to the terminal. Specifically, MSG2 may be transmitted, which carries the system information requested by the terminal or may also carry the scheduling information corresponding to the system information. After receiving the scheduling information, the terminal can obtain the requested system information according to the scheduling information. Here, MSG2 is used to transmit the system information, the functions of MSG2 are expanded and there's no need to constructing new signaling. However, when the purpose of the terminal is to request both the system information and the initial access, it is only necessary to include uplink scheduling information corresponding to MSG3 into MSG2, and the terminal can initiate a RRC connection request to the base station according to the uplink scheduling information in MSG3, and receive MSG4 transmitted by the base station to complete the random access. Moreover, since MSG1 also includes the system information request, the base station can also carry the system information requested by the terminal in MSG2, thereby completing system information transmission and initial access.

Therefore, when the base station can distinguish the request for system information and/or the request for initial access from the terminal, the base station can carry different information contents by transmitting MSG2 to meet various requirements of the terminal, without constructing new signaling, and the two processes can be performed simultaneously, which not only saves signaling, but also improves system efficiency.

In the embodiment of the present disclosure, the base station can configure the PRACH parameters for the terminal according to an access purpose of the terminal, the terminal can select appropriate PRACH parameters according to its own access purpose to transmit a random access request to the base station; when the access purpose of the terminal is to request system information, the system information can be transmitted to the terminal, thereby realizing the transmission of system information. The PRACH parameters include the number of the PRACH occasion and the time interval for the terminal to retransmit the random access request, and can be flexibly configured according to the requirements of the terminal, which can not only fully meet the requirements of the terminal, but also meet the compatibility of the communication system, and facilitate system efficiency improvement.

Of course, the terminal can also include identification information of the access purpose in the transmitted random access request, and the identification information can be pre-agreed with the base station or configured by the system default. After receiving the random access request, the base station can also know the access purpose of the terminal according to the identification information, and then return corresponding information to the terminal, which is not limited in the embodiment of the present disclosure.

Figure 3:
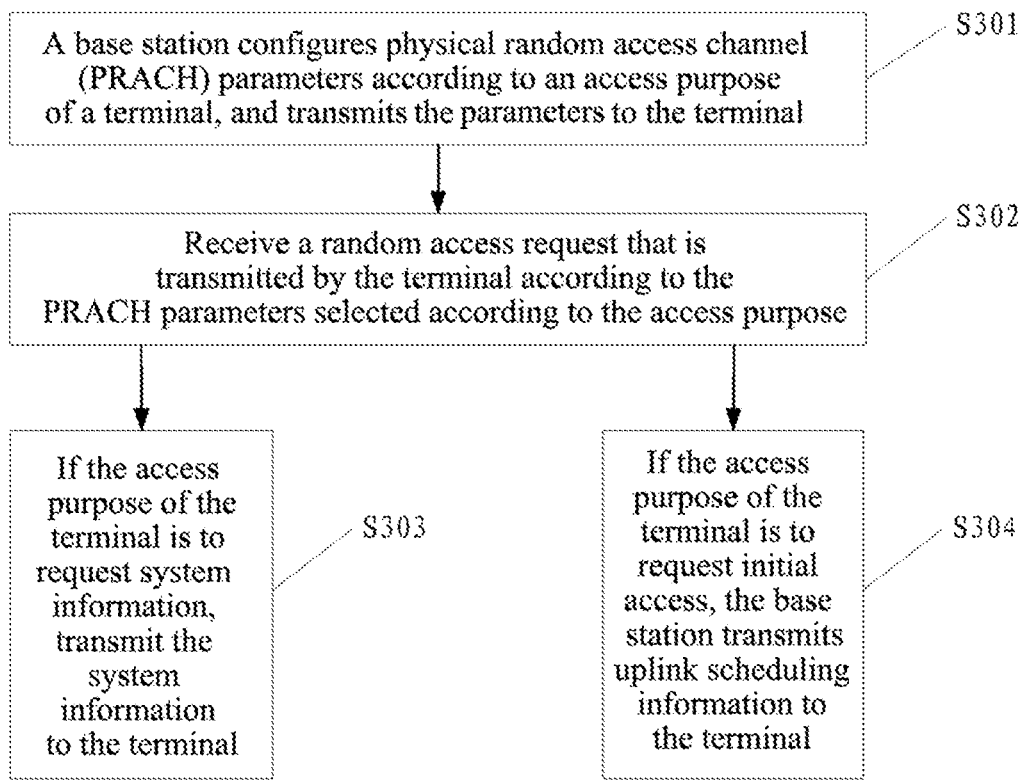
FIG. 3 is a schematic flowchart of a second embodiment of a system information transmission method according to the present disclosure.

FIG. 3 is a schematic flowchart of a second embodiment of a system information transmission method according to the present disclosure; in the present embodiment, the method includes following steps:

S301, a base station configures physical random access channel (PRACH) parameters according to an access purpose of a terminal, and transmits the parameters to the terminal.

S302, the base station receives a random access request transmitted by a terminal.

The PRACH parameters include a number of a PRACH occasion and a time interval for the terminal to retransmit a random access request, and each of the PRACH occasion corresponds to a different PRACH resource.

The access purpose includes to request system information or to request initial access.

S303, if the access purpose of the terminal is to request system information, transmit the system information to the terminal.

The number of the PRACH occasion is at least one, and the time interval for the terminal to retransmit the random access request is larger than a period of system information broadcasting by the base station.

In order to improve the success rate of the terminal obtaining the system information, more than two PRACH occasions can usually be selected.

S304, if the access purpose of the terminal is to request initial access, the base station transmits uplink scheduling information to the terminal.

The number of the PRACH occasion is one, and the time interval for the terminal to retransmit the random access request is smaller than the time interval for the terminal to retransmit the random access request when requesting the system information.

In an embodiment, the above information requested by the terminal can be carried by MSG2.

The PRACH parameters are configured by the base station and transmitted to the terminal, or the PRACH parameters are preconfigured by a system and stored in the base station and the terminal.

In an embodiment, when the PRACH parameters are configured, the configuration can also be performed according to the period of broadcasting or the service delay requirements corresponding to the system information (it can also be understood as the type of SI, such as system information that is important and the terminal wants to acquire quickly or system information that is less important and the terminal can acquire slightly slower). For example, for a terminal of a Vehicle to X (V2X) type, it needs fast information transmission, the period of system information broadcasting is short, and the service transmission delay is low, so the period of transmitting SI can be shorter than the period of transmitting SI for a terminal of a Manual Toll Collection (MTC) system type in the Internet of Things. Correspondingly, the number of the PRACH occasion configured for one transmission for requesting SI of V2X is N1, and the interval between two random access requests is T1; the number of the PRACH occasion configured for one transmission for requesting SI of MTC is N2, and the interval between two PRACH requests is T2. Then N1<N2 and T1<T2.

Such a configuration can ensure that a terminal with more urgent requirements can get a faster response, thereby facilitating an improvement in the efficiency of the entire system.

In addition, for the specific configuration mode, since there is a certain correlation between the number N of occasions used to transmit one random access request and the time interval T between the preceding and the following random access requests, therefore, the number of the PRACH occasion and the time interval for the terminal to retransmit the random access request can be obtained by configuring a value of a same variable.

For example, the number of the PRACH occasion can be configured as N=n+u, the time interval for the terminal to retransmit the random access request can be configured as T=t+u, where both n and t are preset constants, u is a positive integer variable, and the value of u is positively correlated with the period of broadcasting that corresponds to the system information requested by the terminal.

This description indicates that the more PRACH occasions are used to transmit one random access request, the longer the time interval between transmitting the preceding random access and transmitting the following random access request. In this way, for different types of SI requests, the system can be implemented by configuring different values of u. At this time, the two preset constants of n and t can be fixed in the system standard, and the corresponding relation between the service delay requirement (i.e. SI type) corresponding to different system information, and u, is configured through the system information.

Of course, the above formula is only to illustrate the correlation between N and T. The specific description of N and T by the variable u is not limited to this, for example, N can also be equal to 3*u, T=4*u or T=4*u+1, etc., which is not limited in the embodiment of the present disclosure.

And the positive correlation here indicates that the lower the service transmission delay corresponding to the system information requested by the terminal, the lower the value of u; the higher the service transmission delay corresponding to the system information requested by the terminal, the higher the value of u, and correspondingly, the higher the values of N and T. For example, for a V2X terminal, N1=n+u1, T1=t+u1, while for an Internet of Things terminal, N2=n+u2, T2=T+u2; since the service transmission delay corresponding to the system information requested by the V2X terminal is low, it can satisfy the requirement that a car can quickly obtain information during driving, so u1 is smaller than u2, resulting in N1<N2 and T1<T2.

In the present embodiment, it is specifically described how the base station can flexibly reply according to the access purpose of the random access request transmitted by the terminal, and the specific configuration of PRACH parameters is expanded and optimized. Through the expansion and optimization in the present embodiment, flexible configuration can be performed according to bow urgent the terminal needs the system information, and the PRACH parameters can be described by using one variable, thereby further improving the operating efficiency of the system.

It should be noted that when the PRACH parameters are configured by the base station, the whole process is as follows:

1, the base station configures the PRACH parameters based on the terminal access purpose and transmits the PRACH parameters to the terminal;
2, the terminal selects corresponding PRACH parameter according to its own access purpose and transmits the random access request; if the access purpose of the terminal is to request system information, the number of the PRACH occasion is at least one, and the time interval for the terminal to retransmit the random access request is larger than the period of system information broadcasting by the base station; if the access purpose of the terminal is to request the initial access, the number of the PRACH occasion is one, and the time interval for the terminal to retransmit the random access request is smaller than the time interval for the terminal to retransmit the random access request when requesting the system information;
3, the base station can determine the access purpose of the terminal according to the physical random access channel (PRACH) parameters that are used by the terminal to transmit the random access request, or determine the access purpose of the terminal according to other indication information of the access purpose;

4, if the access purpose of the terminal is to request the system information, the base station transmits the system information to the terminal; if the access purpose of the terminal is to request the initial access, the base station transmits uplink scheduling information to the terminal; if the access purpose of the terminal is to request both the system information and the initial access, the base station transmits the system information and the uplink scheduling information to the terminal.

And in the above process, the random access request transmitted by the terminal to the base station can be carried by MSG1, the information requested by the terminal transmitted by the base station to the terminal can be carried by MSG2, thereby achieving the purpose of being compatible with conventional random access process, saving signaling resources and improving system efficiency.

Figure 4:
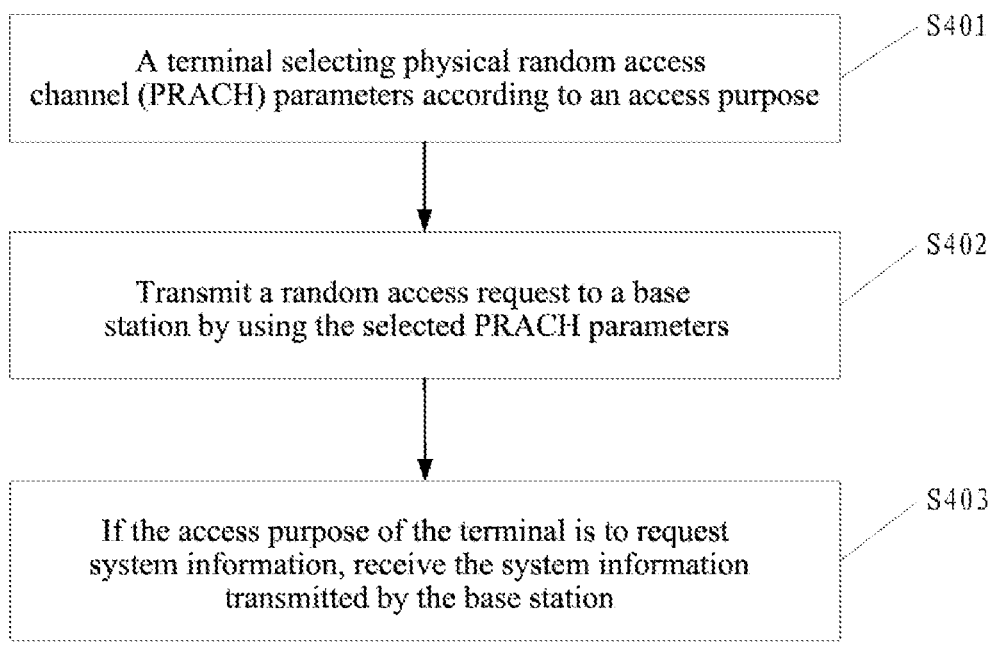
FIG. 4 is a schematic flowchart of a third embodiment of a system information transmission method according to the present disclosure.

FIG. 4 is a schematic flowchart of a third embodiment of a system information transmission method according to the present disclosure; in the present embodiment, the method includes the following steps:

S401, a terminal selects physical random access channel (PRACH) parameters according to an access purpose.

The access purpose includes to request system information or to request initial access, the PRACH parameters include a number of a PRACH occasion and the time interval for the terminal to retransmit a random access request, and each of the PRACH occasion corresponds to a different PRACH resource.

S402, transmit the random access request to a base station by using the selected PRACH parameters.

S403, if the access purpose of the terminal is to request system information, receive the system information transmitted by the base station.

The PRACH parameters are configured by the base station and transmitted to the terminal, or the PRACH parameters are preconfigured by a system and stored in the base station and the terminal.

FIG. 4 is a description of an embodiment on the terminal side, and the embodiment on the base station side shown in FIG. 2 can be referred to for the specific process, which will not be repeated herein.

Figure 5:
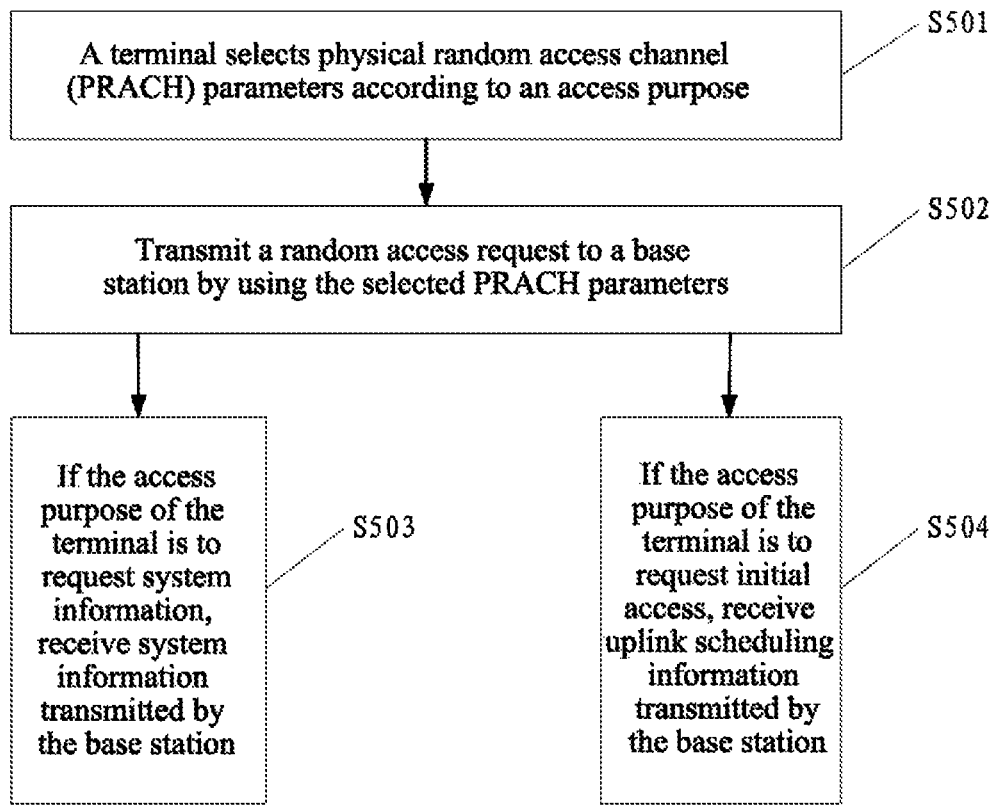
FIG. 5 is a schematic flowchart of a fourth embodiment of a system information transmission method according to the present disclosure.

FIG. 5 is a schematic flowchart of a fourth embodiment of a system information transmission method according to the present disclosure; in the present embodiment, the method includes following steps:

S501, a terminal selects physical random access channel (PRACH) parameters according to an access purpose.

The access purpose includes to request system information or to request initial access, the PRACH parameters include a number of a PRACH occasion and a time interval for the terminal to retransmit a random access request, and each of the PRACH occasion corresponds to a different PRACH resource.

S502, transmit a random access request to a base station using the selected PRACH parameters.

S503, if the access purpose of the terminal is to request system information, receive the system information transmitted by the base station.

The number of the PRACH occasion is at least one, and the time interval for the terminal to retransmit the random access request is larger than a period of system information broadcasting by the base station.

S504, if the access purpose of the terminal is to request initial access, receive uplink scheduling information transmitted by the base station.

The number of the PRACH occasion is one, and the time interval for the terminal to retransmit the random access request is smaller than the time interval for the terminal to retransmit the random access request when requesting the system information.

FIG. 5 is a description of an embodiment on the terminal side, and the embodiment on the base station side shown in FIG. 3 can be referred to for the specific process, which is not repeated here.

Figure 6:
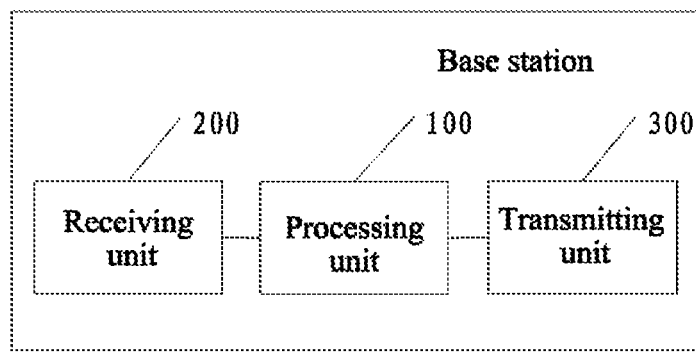
FIG. 6 is a schematic diagram showing the composition of a first embodiment of a base station according to the present disclosure.

FIG. 6 is a schematic diagram showing the composition of a first embodiment of a base station according to the present disclosure; in the present embodiment, the base station includes:

a processing unit 100, configured to configure physical random access channel (PRACH) parameters according to an access purpose of a terminal and transmit the parameters to the terminal, where the access purpose includes to request system information or to request initial access, the PRACH parameters include a number of a PRACH occasion and a time interval for the terminal to retransmit a random access request, and each of the PRACH occasion corresponds to a different PRACH resource;

a receiving unit 200, configured to receive a random access request that is transmitted by the terminal according to the PRACH parameters selected according to the access purpose;

a transmitting unit 300, configured to transmit the system information to the terminal if the access purpose of the terminal is to request the system information.

In an embodiment, if the access purpose of the terminal is to request the system information, the number of the PRACH occasion is at least one, and the time interval for the terminal to retransmit the random access request is larger than a period of system information broadcasting by the base station.

In an embodiment, if the access purpose of the terminal is to request the initial access, the transmitting unit 300 is further configured to transmit uplink scheduling information to the terminal, the number of the PRACH occasion is one, and the time interval for the terminal to retransmit the random access request is smaller than the time interval for the terminal to retransmit the random access request when requesting the system information.

In an embodiment, the PRACH parameters are configured by the base station and transmitted to the terminal, or the PRACH parameters are preconfigured by a system and stored in the base station and the terminal.

In an embodiment, the number of the PRACH occasion and the time interval for the terminal to retransmit the random access request are obtained by configuring a value of a same variable, and the value of the variable is positively correlated with the period of broadcasting that corresponds to the system information requested by the terminal.

Figure 7:
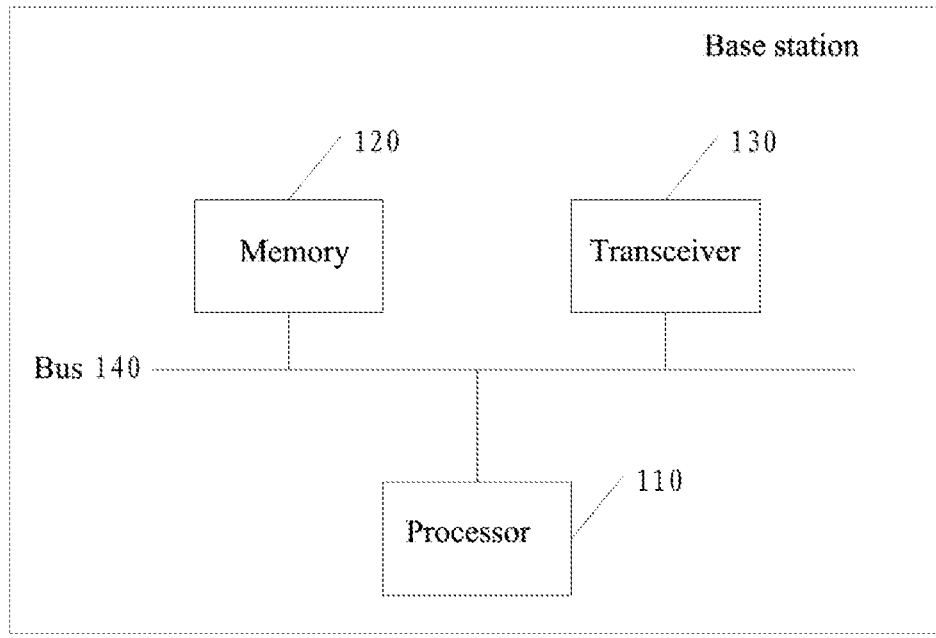
FIG. 7 is a schematic diagram showing the composition of a second embodiment of a base station according to the present disclosure.

FIG. 7 is a schematic diagram showing the composition of a second embodiment of a base station according to the present disclosure; in the present embodiment, the base station includes:

a processor 110, a memory 120, a transceiver 130 and a bus 140, the processor 110, the memory 120 and the transceiver 130 being connected by a bus, where the transceiver 130 is configured to receive and transmit signals and communicate with a terminal, the memory 120 is configured to store a set of program codes, the processor 110 is configured to invoke the program codes stored in the memory 120, and perform the following operations:

configuring physical random access channel (PRACH) parameters according to an access purpose of a terminal and transmitting to the terminal through the transceiver 130, where the access purpose includes to request system information or to request initial access, the PRACH parameters include a number of a PRACH occasion and a time interval for the terminal to retransmit a random access request, and each of the PRACH occasion corresponds to a different PRACH resource;

receiving through the transceiver 130 a random access request transmitted by the terminal according to the PRACH parameters selected according to the access purpose;

if the access purpose of the terminal is to request the system information, transmitting the system information to the terminal through the transceiver 130.

In an embodiment, if the access purpose of the terminal is to request the system information, the number of the PRACH occasion is at least one, and the time interval for the terminal to retransmit the random access request is larger than a period of system information broadcasting by the base station.

In an embodiment, if the access purpose of the terminal is to request the initial access, the processor 110 is, further configured to transmit uplink scheduling information to the terminal through the transceiver 130, the number of the PRACH occasion is one, and the time interval for the terminal to retransmit the random access request is smaller than the time interval for the terminal to retransmit the random access request when requesting the system information.

In an embodiment, the PRACH parameters are configured by the base station and transmitted to the terminal, or the PRACH parameters are preconfigured by a system and stored in the base station and the terminal.

In an embodiment, the number of the PRACH occasion and the time interval for the terminal to retransmit the random access request are obtained by configuring a value of a same variable, and the value of the variable is positively correlated with a period of broadcasting that corresponds to the system information requested by the terminal.

Figure 8:
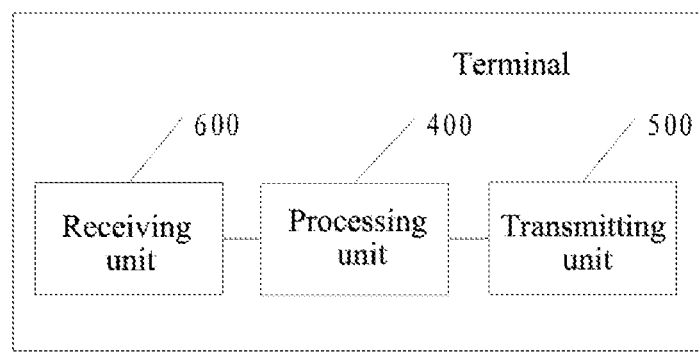
FIG. 8 is a schematic diagram showing the composition of a first embodiment of a terminal according to the present disclosure.

FIG. 8 is a schematic diagram showing the composition of a first embodiment of a terminal according to the present disclosure; in the present embodiment, the terminal includes:

a processing unit 400, configured to select physical random access channel (PRACH) parameters according to an access purpose, where the access purpose includes to request system information or to request initial access, the PRACH parameters include a number of a PRACH occasion and a time interval for the terminal to retransmit a random access request, and each of the PRACH occasion corresponds to a different PRACH resource;

a transmitting unit 500, configured to transmit the random access request to a base station by using the selected PRACH parameters;

a receiving unit 600, configured to receive the system information transmitted by the base station if the access purpose of the terminal is to request the system information.

In an embodiment, if the access purpose of the terminal is to request the system information, the number of the PRACH occasion is at least one, and the time interval for the terminal to retransmit the random access request is larger than a period of system information broadcasting by the base station.

In an embodiment, if the access purpose of the terminal is to request the initial access, the receiving unit 600 is further configured to receive uplink scheduling information transmitted by the base station, the number of the PRACH occasion is one, and the time interval for the terminal to retransmit the random access request is smaller than the time interval for the terminal to retransmit the random access request when requesting the system information.

In an embodiment, the PRACH parameters are configured by the base station and transmitted to the terminal, or the PRACH parameters are preconfigured by a system and stored in the base station and the terminal.

In an embodiment, the number of the PRACH occasion and the time interval for the terminal to retransmit the random access request are obtained by configuring a value of a same variable, and the value of the variable is positively correlated with a period of broadcasting that corresponds to the system information requested by the terminal.

Figure 9:
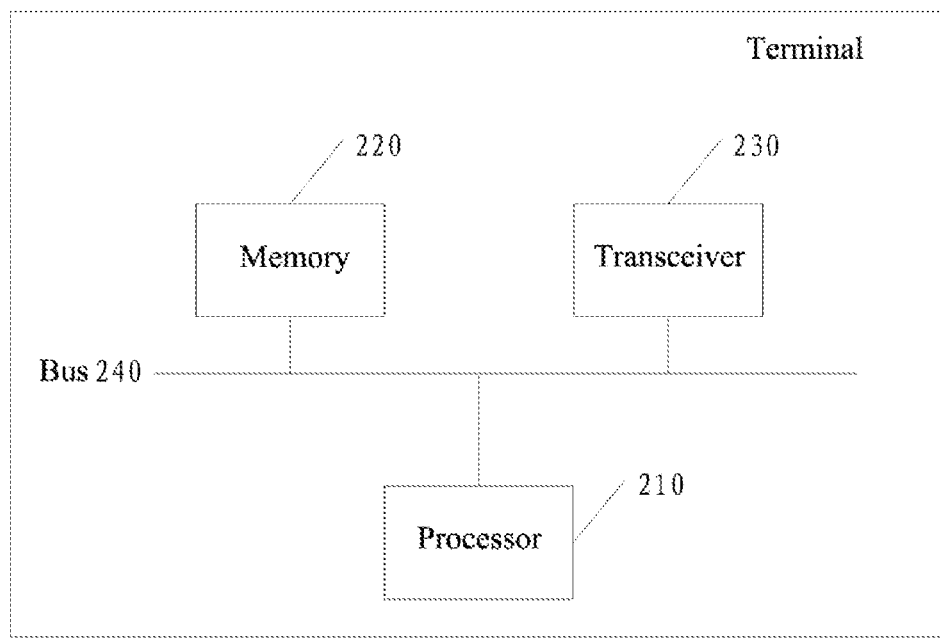
FIG. 9 is a schematic diagram showing the composition of a second embodiment of a terminal according to the present disclosure.

FIG. 9 is a schematic diagram showing the composition of a second embodiment of a terminal according to the present disclosure; in the present embodiment, the terminal includes:

a processor 210, a memory 220, a transceiver 230 and a bus 240, the processor 210, the memory 220 and the transceiver 230 being connected by a bus 240, where the transceiver 230 is configured to receive and transmit signals and communicate with a base station, the memory 220 is configured to store a set of program codes, the processor 210 is configured to invoke the program codes stored in the memory 220, and perform the following operations:

selecting physical random access channel (PRACH) parameters according to an access purpose, where the access purpose includes to request system information or to request initial access, the PRACH parameters include a number of a PRACH occasion and a time interval for the terminal to retransmit a random access request, and each of the PRACH occasion corresponds to a different PRACH resource;

transmitting the random access request to a base station through the transceiver 230 using the selected PRACH parameters;

if the access purpose of the terminal is to request the system information, receiving through the transceiver 230 the system information transmitted by the base station.

In an embodiment, if the access purpose of the terminal is to request the system information, the number of the PRACH occasion is at least one, and the time interval for the terminal to retransmit the random access request is larger than a period of system information broadcasting by the base station.

In an embodiment, if the access purpose of the terminal is to request the initial access, the processor is further configured to receive through the transceiver uplink scheduling information transmitted by the base station, the number of the PRACH occasion is one, and the time interval for the terminal to retransmit the random access request is smaller than the time interval for the terminal to retransmit the random access request when requesting the system information.

In an embodiment, the PRACH parameters are configured by the base station and transmitted to the terminal, or the PRACH parameters are preconfigured by a system and stored in the base station and the terminal.

In an embodiment, the number of the PRACH occasion and the time interval for the terminal to retransmit the random access request are obtained by configuring a value of a same variable, and the value of the variable is positively correlated with a period of broadcasting that corresponds to the system information requested by the terminal.

The base station described in the embodiment of the present disclosure can be configured to implement some or all of the processes in the embodiments of the method described in connection with FIGS. 2 to 3 of the present disclosure, and perform some or all of the functions in the embodiment of the apparatus described in connection with FIG. 6 of the present disclosure. The terminal described in the embodiment of the present disclosure can be configured to implement some or all of the processes in the embodiments of the method described in connection with FIGS. 4 to 5 of the present disclosure, and perform some or all of the functions in the embodiment of the apparatus described in connection with FIG. 8 of the present disclosure, which is not repeated here.

In one or more examples, the functions described can be implemented in hardware, software, firmware, or any combination thereof. If implemented in software, the functions can be stored in or transmitted by a computer readable medium as one or more instructions or codes and executed by a hardware-based processing unit. The computer readable medium can include a computer readable storage medium (which corresponds to a tangible medium such as a data storage medium) or a communication medium including, for example, any medium that facilitates transfer of a computer program from one place to another according to a communication protocol. In this manner, the computer readable medium can generally correspond to (1) a non-transitory tangible computer readable storage medium, or (2) a communication medium such as a signal or carrier wave. The data storage medium can be any available medium accessible by one or more computers or one or more processors to retrieve instructions, codes, and/or data structures for implementing the techniques described in the present disclosure. The computer program product can include a computer readable medium.

By way of example but not limitation, some computer readable storage media can include RAM, ROM, EEPROM, CD-ROM or other optical disk storage, magnetic disk storage or other magnetic storage apparatuses, flash memory, or any other media that can be used to store desired program code in the form of instructions or data structures and that can be accessed by a computer. Moreover, any connection can be appropriately referred to as a computer readable medium. For example, if instructions are sent from a website, server, or other remote source using a coaxial cable, fiber optic cable, twisted pair, digital subscriber line (DSL), or wireless technologies (e.g., infrared, radio, and microwave), then the coaxial cable, fiber optic cable, twisted pair, DSL, or wireless technologies (e.g., infrared, radio, and microwave) are included in the definition of medium. However, it should be understood that computer readable storage media and data storage media do not include connection, carrier wave, signal, or other transitory media, but rather relate to non-transitory tangible storage media. Disk and disc, as used herein, include compact disc (CD), laser disc, optical disc, digital video disc (DVD), floppy disk and Blu-ray disc where disks usually reproduce data magnetically, while discs reproduce data optically by laser. Combinations of the above should also be comprised within the scope of computer readable media.

The instructions can be performed by one or more processors such as one or more digital signal processors (DSP), general purpose microprocessors, application specific integrated circuits (ASIC), field programmable gate arrays (FPGA) or other equivalent integrated or discrete logic circuits. Thus, the term "processor" as used herein can refer to any of the foregoing structures or any other structure suitable for implementing the techniques described herein. In addition, in some aspects, the functionality described herein can be provided within dedicated hardware and/or software modules configured for encoding and decoding, or incorporated into a combined codec. Moreover, the techniques can be fully implemented in one or more circuits or logic elements.

The techniques of the present disclosure can be widely implemented by a variety of apparatuses or devices including a wireless handset, an integrated circuit (IC) or a set of ICs (e.g., a chip set). Various components, modules, or units are described in the present disclosure to emphasize functional aspects of apparatuses configured to perform the disclosed techniques, but are not necessarily required to be implemented by different hardware units. Specifically, as described above, various units can be combined in a codec hardware unit or provided by a collection of interoperable hardware units (including one or more processors as described above) in conjunction with suitable software and/or firmware.

It should be understood that "one embodiment" or "an embodiment" means that a particular feature, structure or property in relation to an embodiment is included in at least one embodiment of the disclosure. Therefore, "in one embodiment" or "in an embodiment" appearing throughout the specification does not necessarily refer to the same embodiment. Furthermore, these specific features, structures or features may be combined in one or more embodiments in any proper manner In various embodiments of the present disclosure, it should be understood that the sequence numbers of the above processes does not indicate the order of execution, and the order of execution of each process should be determined by its function and internal logic, and should not be taken in a limiting sense to the implementation process of the embodiment of the present disclosure.

Additionally, terms "system" and "network" herein can be used interchangeably herein. It should be understood that the term "and/or" herein is merely an association relationship describing an associated object, indicating that there may be three kinds of relationships, for example, A and/or B may indicate three kinds of relationships: A exists separately, A and B exist simultaneously, and B exists separately. In addition, the character "/" herein generally indicates that the contextual object is in an "or" relationship.

In the embodiments of the present disclosure, it should be understood that "B corresponding to A" indicates that B is associated with A, and B can be determined according to A. However, it should also be understood that determining B according to A does not refer to that B is determined only according to A, but can also be determined according to A and/or other information.

Those of ordinary skill in the art will appreciate that the unit and algorithm steps of the various examples described in connection with the embodiments disclosed herein can be implemented in electronic hardware, computer software, or a combination of thereof. In order to clearly illustrate the interchangeability of hardware and software, the components and steps of each example are described in general terms of function in the above instructions. Whether these functions are performed in hardware or software depends on the specific application and design constraints of the technical solution. A person skilled in the art may implement the described functions in different ways for each particular application, but such an implementation should not be considered to be beyond the scope of the present disclosure.

A person skilled in the art can clearly understand that for the convenience and brevity of the description, the specific working process of the system, the apparatus and the unit described above can refer to the corresponding process in the foregoing method embodiment, which will not be repeated herein.

In the several embodiments provided by the present disclosure, it should be understood that the disclosed system, apparatus and method may be implemented in other manners. For example, the apparatus embodiments described above are merely illustrative. For example, the division of the units is only a division of logical functions. In actual implementation, there may be another division manner, for example, multiple units or components may be combined or integrated into another system, or some features may be ignored or not implemented. Moreover, the coupling, direct coupling or communication connection shown or discussed may be an indirect coupling or communication connection through some interfaces, apparatuses or units, and may be in electrical, mechanical or other form.

The units described as separate components may or may not be physically separated, and the components illustrated as units may or may not be physical units, that is, may be located in one place, or may be distributed to multiple network units. Some or all of the units may be selected according to actual needs to achieve the objectives of the solution of the embodiment.

In addition, each functional unit in each embodiment of the present disclosure may be integrated into one processing unit, or each unit may exist physically separately, or two or more units may be integrated into one unit.

The above is only the specific embodiment of the present disclosure, but the scope of protection of the disclosure is not limited thereto. Any change or replacement that may be readily contemplated by anyone skilled in the art within the scope of technology disclosed by the present disclosure shall be covered by the scope of protection of the present disclosure. Therefore, the scope of protection of the present disclosure is subject to the claims.

What is claimed is:

1. A system information transmission method, comprising:
   selecting, by a terminal; physical random access channel (PRACH) parameters according to an access purpose and a preset mapping relationship between the PRACH parameters and the access purpose, wherein the access purpose comprises to request system information or to request initial access, the PRACH parameters comprise a number of a PRACH occasion and a time interval for the terminal to retransmit a random access request, and each of the PRACH occasion corresponds to a different PRACH resource;
   transmitting the random access request to a base station by using the selected PRACH parameters; and
   receiving the system information transmitted by the base station if the access purpose of the terminal is to request the system information.

2. The method according to claim 1, wherein if the access purpose of the terminal is to request the system information, the number of the PRACH occasion is at least one, and the time interval for the terminal to retransmit the random access request is larger than a period of system information broadcasting by the base station.

3. The method according to claim 1, wherein if the access purpose of the terminal is to request the initial access, receiving uplink scheduling information transmitted by the base station, wherein the number of the PRACH occasion is one, and the time interval for the terminal to retransmit the random access request is smaller than the time interval for the terminal to retransmit the random access request when requesting the system information.

4. The method according to claim 1, wherein the PRACH parameters are configured by the base station and transmitted to the terminal, or the PRACH parameters are preconfigured by a system and stored in the base station and the terminal.

5. The method according to claim 1, wherein the number of the PRACH occasion and the time interval for the terminal to retransmit the random access request are obtained by configuring a value of a same variable, and the value of the variable is positively correlated with a period of broadcasting that corresponds to the system information requested by the terminal.

6. A base station, comprising:
   a processor, a memory, a transceiver and a bus, the processor, the memory and the transceiver being connected by the bus, wherein the transceiver is configured to receive and transmit signals and communicate with a terminal, the memory is configured to store a set of program codes, and the processor is configured to invoke the program codes stored in the memory to perform following operations:
   receiving, through the transceiver, a random access request that is transmitted by the terminal according to physical random access channel (PRACH) parameters selected according to an access purpose, wherein the access purpose comprises to request system information or to request initial access, the PRACH parameters comprise a number of a PRACH occasion and a time interval for the terminal to retransmit the random access request, and each of the PRACH occasion corresponds to a different PRACH resource;
   determining the access purpose of the terminal according to the PRACH parameters and a preset mapping relationship between the PRACH parameters and the access purpose; and
   transmitting, through the transceiver, the system information to the terminal if the access purpose of the terminal is to request the system information.

7. The base station according to claim 6, wherein if the access purpose of the terminal is to request the system information, the number of the PRACH occasion is at least one, and the time interval for the terminal to retransmit the random access request is larger than a period of system information broadcasting by the base station.

8. The base station according to claim 6, wherein if the access purpose of the terminal is to request the initial access, the processor is further configured to transmit, through the transceiver, uplink scheduling information to the terminal, wherein the number of the PRACH occasion is one, and the time interval for the terminal to retransmit the random access request is smaller than the time interval for the terminal to retransmit the random access request when requesting the system information.

9. The base station according to claim 6, wherein the PRACH parameters are configured by the base station according to the access purpose of the terminal and transmitted to the terminal: or the PRACH parameters are preconfigured by a system and stored in the base station and the terminal.

10. The base station according to claim 6, wherein the number of the PRACH occasion and the time interval for the terminal to retransmit the random access request are obtained by configuring a value of a same variable, and the value of the variable is positively correlated with a period of broadcasting that corresponds to the system information requested by the terminal.

11. A terminal, comprising:
a processor, a memory, a transceiver and a bus, the processor, the memory and the transceiver being connected by the bus, wherein the transceiver is configured to receive and transmit signals and communicate with a base station, the memory is configured to store a set of program codes, the processor is configured to invoke the program codes stored in the memory to perform following operations:
selecting physical random access channel (PRACH) parameters according to an access purpose and a preset mapping relationship between the PRACH parameters and the access purpose, wherein the access purpose comprises to request system information or to request initial access, the PRACH parameters comprise a number of a PRACH occasion and a time interval for the terminal to retransmit a random access request, and each of the PRACH occasion corresponds to a different PRACH resource;
transmitting, through the transceiver, the random access request to the base station by using the selected PRACH parameters; and
receiving, through the transceiver, the system information transmitted by the base station if the access purpose of the terminal is to request the system information.

12. The terminal according to claim 11, wherein when the access purpose of the terminal is to request the system information, the number of the PRACH occasion is at least one, and the time interval for the terminal to retransmit the random access request is larger than a period of system information broadcasting by the base station.

13. The terminal according to claim 11, wherein,
if the access purpose of the terminal is to request the initial access, the processor is further configured to receive, through the transceiver, uplink scheduling information transmitted by the base station, wherein the number of the PRACH occasion is one, and the time interval for the terminal to retransmit the random access request is smaller than the time interval for the terminal to retransmit the random access request when requesting the system information.

14. The terminal according to claim 11, wherein the PRACH parameters are configured by the base station and transmitted to the terminal, or the PRACH parameters are preconfigured by a system and stored in the base station and the terminal.

15. The terminal according to claim 11, wherein the number of the PRACH occasion and the time interval for the terminal to retransmit the random access request are obtained by configuring a value of a same variable, and the value of the variable is positively correlated with a period of broadcasting that corresponds to the system information requested by the terminal.

* * * * *